UNITED STATES PATENT OFFICE.

OSSIAN GUTHRIE, OF CHICAGO, ILLINOIS.

AIDING THE FORMATION OF ATMOSPHERIC OR NATURAL ICE.

SPECIFICATION forming part of Letters Patent No. 277,024, dated May 8, 1883.

Application filed January 13, 1883. (No model.)

*To all whom it may concern:*

Be it known that I, OSSIAN GUTHRIE, residing at Chicago, in the county of Cook and State of Illinois, and a citizen of the United States, have invented new and useful Improvements in Aiding the Formation of Atmospheric or Natural Ice, of which the following is a full description.

The object of this invention is to facilitate the formation of atmospheric or natural ice by feeding cooled water under the ice after its formation has commenced, and to introduce such water in such a manner or position as will cause a sufficient movement or circulation of the water next to the ice to prevent the inclosure of air or gas bubbles within the ice during its formation, and thereby increase the quantity or thickness of the ice, and also its character, as the ice formed by ponds subjected to my improvements is a transparent or clear solid ice; and its nature consists in providing the pond where the ice is to be formed with an auxiliary pond or a portion or division of the ice-forming pond with a cooling division, portion, or section, in or by which the temperature of the water is properly diminished before passing to the forming-pond or under the ice, and in the several improvements for circulating, moving, or using the cooled water, as are hereinafter claimed as new.

Water cooled nearly to the point of crystallization, or to 32° Fahrenheit, will remain on the surface or top, and for the purpose of utilizing water cooled nearly or quite to 32° the method and arrangement for the formation of atmospheric or natural ice which I have found best in the absence of any natural pond or shallow lake is to form a suitable pond by diverting a stream of water, if small, or a part thereof, if large, from its channel or bed, and overflowing a body of land sufficient for the formation of the desired quantity of ice; and where the land is so situated or the stream so located that an auxiliary small pond can be formed, I locate such auxiliary pond between the stream and the forming-pond, and in this auxiliary pond I place a wheel or stirrer, to so agitate the water as to cause it to part with its contained or latent heat and bring it down to 32°, when it is permitted to flow into the forming-pond by any suitable sluice or passage way. This sluice or passage way is provided with gates, which are operated to admit the water into the forming-pond when it is properly cooled, it being understood that in very cold weather the water then can be cooled so rapidly as to make the operation continuous, while, when the atmosphere is very slightly below the freezing-point, it will be necessary or advisable to detain the water in the auxiliary or side pond for a sufficient length of time to properly reduce the temperature of the water before its outflow into the forming-pond is permitted.

The forming-pond is provided with one or more outlets in order to prevent the overflow of the ice, which outlets are also provided with gates to keep the water in the forming-pond at its proper height, and in order to produce a movement for as much of the water under and next to the ice as is possible.

The auxiliary pond should be located in reference to the outlet so as to aid as much as possible, and the formation of more than one outlet will also aid in distributing a movement or circulation of the water under the ice.

Where it is not possible to locate an auxiliary pond, then a section, division, or part of the forming-pond is to be used in cooling the water preparatory to using it for the formation of ice, and in case either a natural or artificial pond is used for the ice-forming pond it would be well to form a sluice or ditch around it, so that a number of small outlets may be provided instead of one or two larger ones, as this will insure uniformity in thickness and quality for the whole body of ice. It will be understood that these matters will of necessity be to some extent located and controlled by the surroundings of the natural or artificial pond.

In cases where the stream or other water-supply is lower than the forming-pond it will be elevated by power; and for a low elevation I use a wheel instead of pumps, as by throwing the water up with a wheel it is caused to part with a considerable portion of its latent or earth heat, which would not be the case if pumps were used; and it will also be understood that in many localities it will be advisable to make the auxiliary or preparatory pond by damming the stream to a slight extent, and in places where the water is artificially elevated from the source it will be still further cooled by causing it to flow in a thin or shallow stream over boards, flag-stones, or other proper sluiceway, and it will be advantageous in all places where the water is to be cooled to keep the stream as shallow as practicable with the continuation of the operations of cooling and discharging the water into the forming-pond.

It will also be found advantageous to so construct the stirring-wheel, where only one is used, that a portion of the water will be thrown into the air in the form of drops or spray, which will be congealed in the atmosphere when a low temperature prevails; but this spraying will at all times aid even though the atmospheric temperature is not sufficiently low to congeal it, but below the freezing-point.

This method of facilitating the natural or atmospheric formation of ice is, to a certain extent, an improvement on the method patented to me November 29, 1881, as it employs the method there described of getting rid of gas and air bubbles; otherwise it is materially different, as this process of cooling the water and reducing its temperature for congelation or crystallization greatly facilitates the formation or thickness of formation of the ice, and in this respect improves its character, while it remains clear or transparent, and thus produces ice of the very first character and quality, which is uniform in thickness, and by its use I am able in a short season to improve the thickness and quality of the ice, and in a long season I am able, by this process of aiding the natural formation of ice, to form and cut several more crops than could be harvested from the same body of water without the aid of my improvements.

I have not described the stirrer or wheels used in cooling the water or in elevating, where elevation is necessary, as it will be readily understood that such apparatus must be adapted to the location where it is to be used, and will therefore greatly vary in its construction. An ordinary paddle-wheel run at a speed sufficient to spray or throw up a portion of the water of the auxiliary or preparatory pond, or parts of the stream or forming-pond used for cooling purposes, will be sufficient, and where waterpower cannot be obtained it may be operated by steam or other suitable motor connected with the wheel in the simplest manner possible.

What I claim as new, and desire to secure by Letters Patent, is as follows:

1. The improved process of aiding the formation of natural or atmospheric ice by first reducing the temperature of the water to the freezing-point, and then causing it to flow beneath the ice of an ice-forming pond or lake, substantially as specified.

2. The combination of an auxiliary or preparatory cooling pond or section with an ice-forming pond or lake, whereby the water is cooled in one place and congealed in another, substantially as described.

OSSIAN GUTHRIE.

Witnesses:
A. H. ADAMS,
E. T. BOND.